United States Patent [19]

Landa

[11] 4,334,762
[45] Jun. 15, 1982

[54] SINGLE FIXED POSITION LENS VARIABLE COPY SIZE OPTICAL SYSTEM FOR COPYING MACHINE

[75] Inventor: Benzion Landa, Edmonton, Canada

[73] Assignee: Savin Corporation, Valhalla, N.Y.

[21] Appl. No.: 85,110

[22] Filed: Oct. 15, 1979

[51] Int. Cl.³ .................... G03G 15/28; G03B 27/52
[52] U.S. Cl. ........................................ 355/8; 355/11; 355/30; 355/57
[58] Field of Search ............... 355/3 R, 8, 11, 43, 355/51, 57, 30

[56] References Cited

U.S. PATENT DOCUMENTS

| | | | |
|---|---|---|---|
| 3,598,489 | 8/1971 | Thomas et al. | 355/57 X |
| 3,914,044 | 10/1975 | Ogawa | 355/8 |
| 3,947,188 | 3/1976 | Simpson | 355/57 X |
| 4,077,714 | 3/1978 | Komori et al. | 355/8 X |
| 4,080,062 | 3/1978 | Torigai et al. | 355/8 X |
| 4,154,524 | 5/1979 | Hattori et al. | 355/8 X |
| 4,212,532 | 7/1980 | Suzuki | 355/60 |
| 4,232,960 | 11/1980 | Glab | 355/11 X |

Primary Examiner—Fred L. Braun
Attorney, Agent, or Firm—Shenier & O'Connor

[57] ABSTRACT

A copy image size changing system for a copying machine incorporating an original scanning optical system in which a change in the size of the copy image is effected by shifting the positions of reflecting elements disposed at locations along the optical axis of the copier on opposite sides of a fixedly positioned lens. Preferably the lens forms part of a partition which separates the scanning part of a liquid developer machine in which heat is generated by the original illuminating lamp and the developing process part wherein the liquid developer is stored and the photosensitive element is located.

12 Claims, 2 Drawing Figures

SINGLE FIXED POSITION LENS VARIABLE COPY SIZE OPTICAL SYSTEM FOR COPYING MACHINE BACKGROUND OF THE INVENTION

My invention relates to the art of copying machines, and more particularly to an improved original-scanning optical system which is capable of focusing different-sized images of an original on a photoconductive surface and which permits of the separation of the machine into a first section housing the exposure system and a second section housing the material and apparatus for carrying out the developing process.

There are known in the prior art copying machine original-scanning optical systems capable of producing both a copy of the same size as the original and a copy of reduced size. All such optical systems incorporating a fixed-focal-length lens required at least two optical elements to be moved in order to achieve a change in copy size. Both the length of the optical path between the original and the lens (object distance) and the length of the optical path between the lens and the photoconductive surface (image distance), as well as the overall length of the optical path, must be changed to change copy size.

Certain original-scanning optical systems of the prior art, such as disclosed in Satomi U.S. Pat. No. 4,040,733, achieve a change in copy size by moving both the lens and a mirror between the lens and the photoconductive surface. Other systems such as disclosed in Weinstein U.S. Pat. No. 3,998,540 change the position of the lens and that of a mirror between the lens and the document. Moreover, such systems of the prior art generally require movement of the lens both along and transverse to its optical axis. While the Satomi patent does disclose one embodiment requiring transverse lens movement only, that embodiment employs a moving-document, stationary-optics scanning system.

It is particularly desirable in copying machines using liquid developers that the section of the machine in which scanning of the original takes place, and in which heat is generated, be as nearly completely isolated as is possible from the section of the machine in which the developing process is carried out and wherein the liquid developer is stored. Such separation tends to reduce vaporization of the developer carrier liquid and the resultant pollution of the ambient atmosphere. Optical systems of the prior art which provide for image reduction by moving the lens do not readily lend themselves to an arrangement in which the scanning section of the machine is isolated from that section wherein the developing operation takes place.

The only instance of which I am aware in which variable magnification is achieved without moving the lens of the optical system is illustrated in Koizumi U.S. Pat. No. 3,535,037 in which optical system the entire original is illuminated at once rather than being scanned. This patent suggests that variable magnification be achieved by altering the positions of two mirrors disposed respectively between the original and the lens and between the lens and the photoconductor surface. Not only does this patent not relate to a scanning optical system but also the apparatus shown therein does not achieve effective separation of the exposure section from the developing section. Further, the mirrors are moved in such a manner as to cause a displacement of the image in the direction of movement of the photoconductive surface. Such displacement, while perhaps acceptable in a system exposing the entire original at once, is highly undesirable in a scanning-type optical system where a narrow slit typically defines the image area.

SUMMARY OF THE INVENTION

One object of my invention is to provide a variable copy size scanning optical system for use with electrophotographic copying machines which does not require the lens of the apparatus to be moved to change copy size.

Another object of my invention is to provide a fixed position lens variable copy size optical system which facilitates isolation of the exposure station of a copying machine from the portion of the machine in which the development process takes place.

Yet another object of my invention is to provide a fixed position lens variable copy size optical system for a liquid developer copying machine while minimizing pollution.

A further object of my invention is to provide a fixed position lens variable copy size optical system which is simple in construction and operation for the result achieved thereby.

Other and further objects of my invention will appear from the following description.

In general, my invention contemplates the provision of a copy image size changing system for a copying machine incorporating an original scanning optical system in which a change in the size of the copy image is effected by shifting the positions of reflecting elements disposed at locations along the optical path of the copier on opposite sides of a fixedly positioned lens. Preferably the lens forms part of a partition which separates the scanning part of a liquid developer machine in which heat is generated by the original illuminating lamp from the developing process part wherein the liquid developer is stored and the photosensitive element is located.

BRIEF DESCRIPTION OF THE DRAWINGS

In the accompanying drawings which form part of the instant specification and which are to be read in conjunction therewith and in which like reference numerals are used to indicate like parts in various views.

DESCRIPTION OF THE PREFERRED EMBODIMENT

Figure 1:
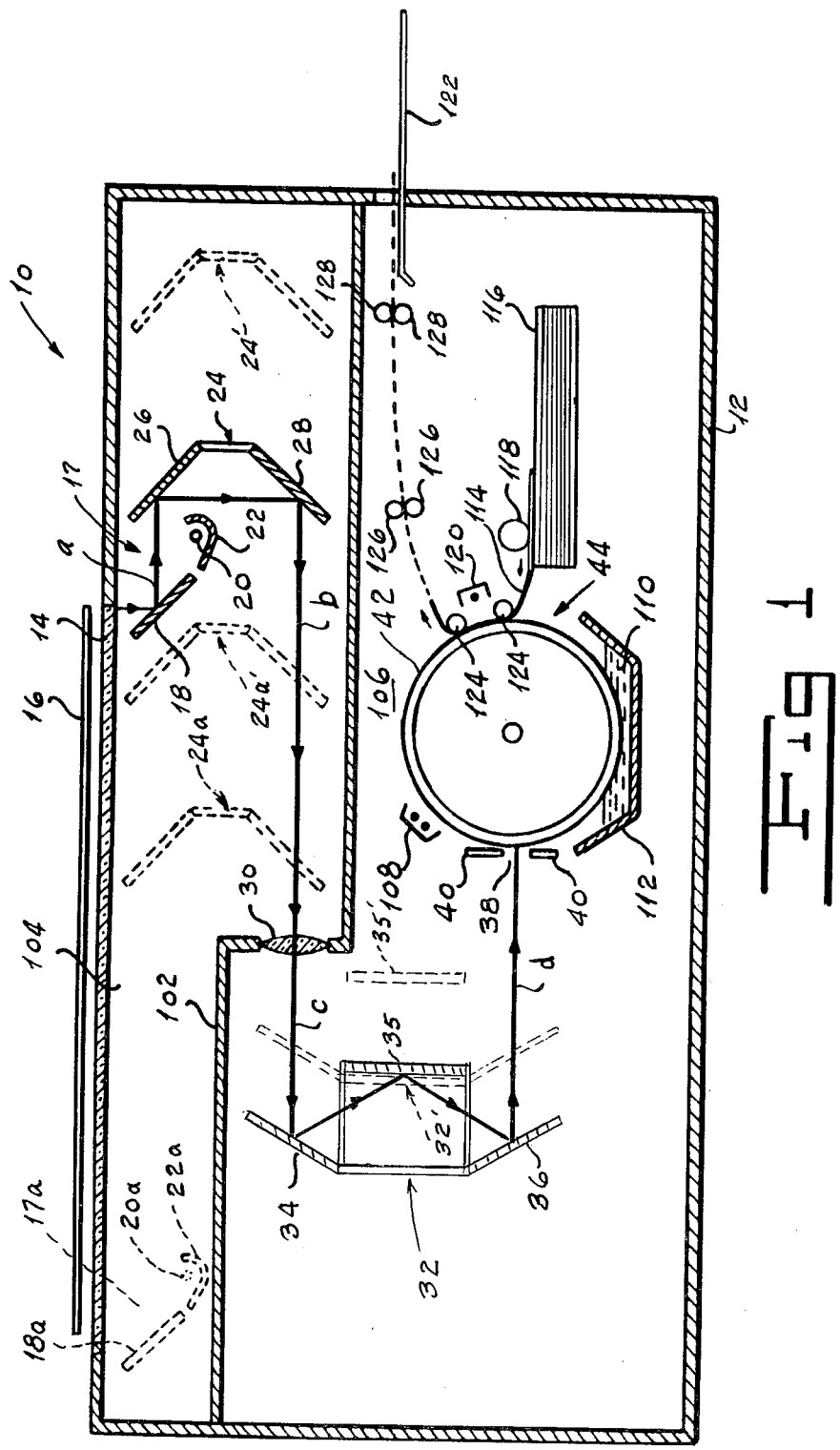
FIG. 1 is a schematic sectional view of a copying machine incorporating the preferred embodiment of my fixed position lens, variable copy size optical system.

Referring now to FIG. 1, one embodiment of a copier, indicated generally by the reference character 10, employing my fixed-lens variable-magnification optical system, is generally enclosed by an outside wall 12 and has a transparent imaging platen 14 on the upper surface thereof for receiving a document 16 to be copied. In the optical system of the copier 10, a "full-rate" assembly indicated generally by the reference numeral 17 is movable as a unit along a path which is parallel to the imaging platen 14 between an initial position shown in solid lines and a final position 17a shown in broken lines to scan the lower, print-bearing surface of the document 16. Assembly 17 comprises a transversely extending high-intensity lamp 20 and parabolic reflector 22 for illuminating the document surface portion being scanned and a transversely elongated mirror 18 for directing reflected light from the scanned document portion along an optical path segment a.

A "half-rate" assembly indicated generally by reference numeral 24 and comprising transversely extending, mutually perpendicular mirrors 26 and 28 redirects incident light from path segment a along a spaced parallel path segment b through a lens 30. As further described below, half-rate assembly 24 moves along a path which is parallel to imaging platen 14 in the same direction as full-rate assembly 17, but at half the speed, to maintain the total optical path length between the scanned portion of document 16 and lens 30 constant. More particularly, in the 1:1 reproduction mode of the copier 10, assembly 24 moves from an initial position shown in solid lines in FIG. 1 to a final position 24a shown in broken lines in the same figure.

Lens 30 is fixedly mounted in a partition 102 dividing the interior of the copier 10 into an optical compartment 104 housing assemblies 17 and 24 and an electrophotographic compartment 106 housing the other components of the copier 10. Preferably partition 102 is so constructed as to form an optical and thermal seal between compartments 104 and 106. Lens 30 directs incident light from path segment b along a path segment c to a mirror assembly indicated generally by the reference numeral 32, comprising transversely extending mirrors 34, 35 and 36. Assembly 32 redirects light from path segment b in the reverse direction along a spaced parallel path segment c onto the photoconductive imaging surface 42 of a cylindrical drum 44. Slit-forming members 40 define an optical slit 38 extending parallel to the axis of the drum 44 to limit the circumferential extent of the image on the surface 42.

Initially, in the 1:1 reproduction mode of the copier 10, the elements of the optical system are relatively positioned as shown in solid lines in FIG. 1 with the path length on either side of the lens 30 being equal to twice the focal length of the lens to provide a focused image of a portion of the document 16 on the drum surface portion adjacent the slit 38. In operation, drum 44 is rotated at a uniform velocity in the counterclockwise direction as shown in FIG. 1 to move the surface 42 first past a corona charger 108 at which the drum surface receives a uniform electrostatic charge and then past the exposure slit 38 at which the drum surface 42 is exposed to a light image of a portion of the original document 16 to selectively discharge the surface 42 to form an electrostatic latent image. Simultaneously with the rotation of the drum 44, the full-rate assembly 17 is moved at the same linear speed as is the drum surface 42 along a scanning path beginning at the position shown in solid lines in FIG. 1 and ending at the position 17a shown in dotted lines in the same figure. At the same time, the half-rate assembly 24 is moved in the same direction as the full-rate assembly 17 but at half the linear speed to maintain the total optical path length constant. By this process, the drum surface 42 is exposed to the document 16 continuously in a stripwise manner to produce the desired electrostatic latent image on surface 42.

The drum surface 42 continues to move through a developer trough 112 in which a liquid developer 110 is applied to the surface to form a developed toner image of the electrostatic latent image in a manner well known in the art. As the drum 44 continues to rotate, the surface 42 moves beneath a pair of rollers 124 which delimit a transfer station at which the developed toner image is transferred from the surface 42 to the surface of a sheet 114 of plain paper. A pick-off roller 118 advances the top sheet 114 from a stack 116 to the drum 44, while a corona charger 120 disposed between rollers 124 on the other side of the sheet 114 from the drum surface 42 provides the sheet with an electrostatic charge opposite in polarity to that of the image toner particles to assist in the transfer of the developed image. After image transfer, the sheet 114 is picked off the surface 42 by any suitable means known to the art (not shown) and moves successively between a first pair of opposing exit rollers 126 and a second pair of opposing exit rollers 128 to a copy tray 122. After the drum surface 42 has moved past all of the processing stations in this manner, it is then cleaned and, if desired, reused in the manner described above to form one or more additonal copies of the original document 16.

In the reduction mode, the copier 10 operates much in the manner described above, except that the half-rate assembly 24 starts at a displaced initial position 24' shown in broken lines in FIG. 1 to obtain the necessary increase in optical path length between the document surface and the lens 30. Since the assembly 24 continues to move at half the rate as that of the mirror 18, the assembly 24 ends up at a position 24a' which is displaced the same distance from position 24' position 24a is from the position shown in solid lines in FIG. 1.

Further in the reduction mode of the copier, the mirror assembly 32 on the other side of the lens 30 is moved to a displaced fixed position 32', shown in broken lines in FIG. 1, to maintain the plane of focus on the portion of photoconductive surface 42 adjacent to slit 38. In the reduction mode, mirror assemblies 17 and 24 are reciprocated at an increased rate of speed relative to the drum surface 42 to maintain the correct proportionality between the axial and circumferential dimensions of the latent image on the surface 42. Thus, if mirror assemblies 24 and 32 are arranged to produce a half-size image on the drum surface 42, the full-rate assembly 17 is moved at twice the liner velocity of drum surface 42, while half-rate assembly 24 is moved at the same linear velocity as the drum surface.

Figure 2:
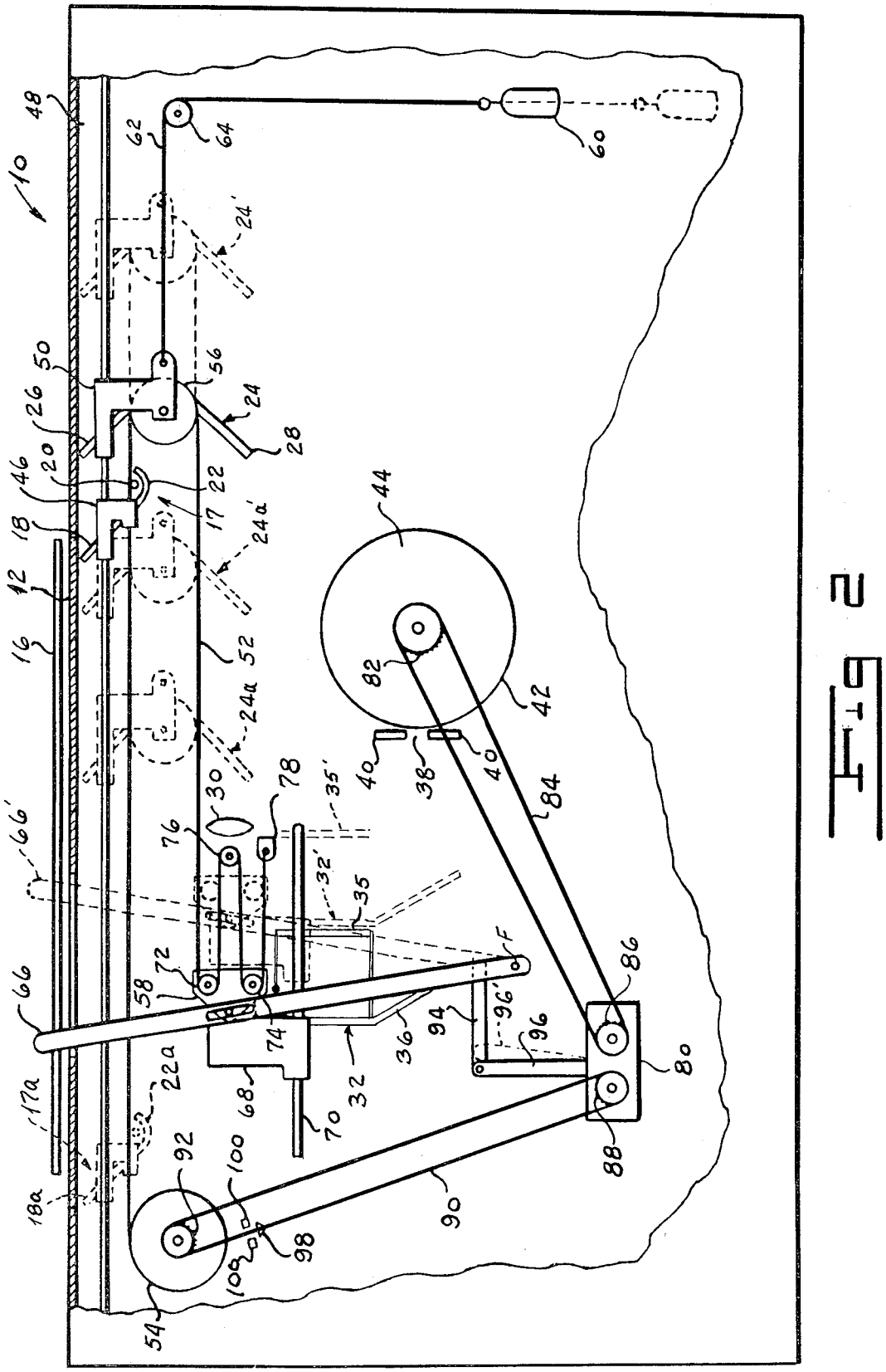
FIG. 2 is a schematic view of the preferred embodiment of my system, with parts broken away, showing the mechanical elements necessary to obtain a change in magnification.

In FIG. 2, I show in detail one mechanism which might be employed for properly coordinating the movements of the mirror assemblies 17, 24 and 32 and the drum surface 42, assuming a 2:1 reduction from original to copy. In this mechanism, a full-rate carriage 46 mounted on a pair of transversely spaced rails 48 for movement parallel to the platen 14 supports full-rate assembly 17. A half-rate carriage 50 mounted on rails 48 supports the half-rate assembly 24 for movement parallel to assembly 17. I direct the free end of a cable 52, one end of which is wrapped around a take-up drum 54, around a first pulley 56 carried by half-rate assembly 50, around a plurality of additional pulleys 72, 76 and 74 to a fixed attachment point 78. I secure one end of another cable 62 to the half-rate carriage 50 and direct the cable around a pulley 64 to a weight 60 to bias the half-rate 50 carriage to the right as viewed in FIG. 2. I arrange the portions of cable 52 adjacent pulley 56 parallel to the document 16 and rails 48 and secure the full-rate carriage 46 to the upper span of cable 52 to provide the desired half-rate synchronization between carriages 46 and 50.

To coordinate the displacement of carriages 24 and 32 for the reduction mode, I secure the mirror assembly 32 to a carriage 68 movable on a pair of transversely spaced rails 70 extending parallel to the rails 48. A bracket 58 mounted on carriage 68 supports the pulleys 72 and 74 receiving cable 52. I mount pulley 76 at a fixed location on the machine to provide a coupling by virtue of which movement of the mirror assembly 32 to a reduced size copy position 32' also moves the half-rate assembly 24 to an initial reduced size copy position 24'. More particularly, pulleys 56, 72, 74 and 76 provide a 2:1 coupling between assemblies 24 and 32 whereby movement of assembly 24 to position 24' to increase the object distance to three times the focal length of lens 30 is accompanied by movement of assembly 32 to position 32' to decrease the image distance to three-halves the focal length of lens 30, thus maintaining a focused image of the surface 42 of drum 44. A lever arm 66 pivoting around a fulcrum point F and attached to the carriage 68 at an intermediate point thereof extends through the housing 12 to permit the machine operator to change to a reduction mode by shifting the lever from a normal position shown in solid lines to a reduction position 66'.

To effect the necessary change of relative speeds of the scanning carriage 46 and the drum surface 42 in the different modes, I couple drum 54 to the output shaft of a speed change box 80 by means of a chain 90 trained around a first sprocket wheel 92 rotating with the drum 54 and a second sprocket wheel 88 rotating with the output shaft of the speed change box 80. The input shaft of the speed change box 80 receives a sprocket wheel 86 coupled to the drum 44 by means of a drive chain 84 also trained around a sprocket wheel 82 rotating with the drum 44.

Speed change box 80 has a control arm 96 movable between a first position as shown in solid lines in FIG. 2 and a second position 96' shown in dotted lines in the same figure. A link 94 couples arm 96 to lever arm 66 so that movement of the lever arm from position 66 to position 66' will correspondingly move the speed control arm 96 to the position 96'. Speed change box 80 and the associated components linking drum 44 to the drum 54 are so selected that drum 54 winds cable 52 at a linear speed equal to the speed of drum surface 44 with the lever 66 in the solid-line position and winds cable 52 at an increased speed to preserve proper image proportions when the lever 66 is in the reduced-magnification position 66'.

Initially in the scanning sequence, the input and output shafts of speed change box 80 are uncoupled from each other by means not shown to permit weight 60 to unwind the cable 52 on drum 54 until a stop 98 attached to drive chain 90 abuts a pair of limit stops 100. At this point, carriages 46 and 50 are properly aligned in their initial positions for scanning. Thereafter, on the forward scanning stroke between the initial positions shown in solid lines and the final positions 17a and 24a of the assemblies 17 and 24, the input and output shafts of speed change box 80 are engaged to synchronize the movement of the drum surface 42 with that of the carriages 46 and 50. When assemblies 17 and 24 reach their final positions 17a and 24a, speed change box 80 is again disengaged to allow weight 60 to return carriages 46 and 50 to their initial positions. The operation in the reduction mode is similar except that the movement of the half-rate carriage 24 is between the displaced initial position 24' and final position 24a'.

In the embodiment described above, effective scanning of the document 16 is achieved by stationarily positioning the document and moving the full-rate assembly 17 and the half-rate assembly 24 in synchronism with the movement of the drum surface 42. However, it will be apparent to those skilled in the art that the principles of my invention are equally applicable to a system in which the optical elements remain stationary for a given copy size and the document is moved relative to the optical elements in synchronism with the movement of the imaging surface. For example, in a modified version of the system described above, the optical assemblies 17 and 24 could remain stationary in their full-line positions for full-size copying, and the document 16 moved to the right by a suitable feeder past assembly 17 at a speed equal to the peripheral speed of the drum 44. For operation in a 2:1 reduction mode, mirror assemblies 24 and 32 would be shifted to positions 24' and 32', as before, while the document 16 would be moved past mirror assembly 17 at twice the peripheral speed of the drum 44 to main correct copy proportions along and transverse to the direction of movement.

It will be seen that I have accomplished the objects of my invention. I have provided an optical system for a copier which allows the reproduction ratio to be changed without moving the lens. Further, my optical system facilitates isolation of the exposure portion of the copier from the portion of the copier in which the development process takes place.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An electrophotographic copier including in combination a lens having a pair of refracting surfaces, means including one of said refracting surfaces for forming a first compartment, means including the other of said refracting surfaces for forming a second compartment, means disposed in said first compartment for illuminating a document to be copied, a photosensitive imaging surface disposed in said second compartment, means including said lens for forming on said imaging surface a focused optical image of said document, said image forming means providing an optical path through said lens between said document and said imaging surface, and means disposed in said second compartment for applying a liquid developer to said imaging surface to form a developed image thereon, said means for forming said first and second compartments forming an optical and thermal seal between said compartments isolating said illuminating means from said liquid developer.

2. A variable magnification electrophotographic copier including in combination a lens having a pair of refracting surfaces, means including one of said refracting surfaces for forming a first compartment, means including the other of said refracting surfaces for forming a second compartment, means disposed in said first compartment for illuminating a document to be copied, a photosensitive imaging surface disposed in said second compartment, means including said lens for forming on said imaging surface a focused optical image of said document having a first magnification, said image forming means providing an optical path through said lens between said document and said imaging surface, means disposed in said second compartment for applying a liquid developer to said imaging surface to form a developed image thereon, said means for forming said first and second compartments forming an optical and thermal seal between said compartments isolating said illuminating means from said liquid developer, and means independent of said lens for concomitantly changing the lengths of the respective portions of said optical path on the object and image sides of said lens in such manner as to produce on said imaging surface a focused image of said document having a second magnification.

3. Apparatus as in claim 2 in which said image forming means comprises respective first and second optical reflectors disposed along said optical path on opposite sides of said lens, said means for changing the lengths of said optical path portions comprising means for moving said reflectors.

4. Apparatus as in claim 2 in which the lengths of said optical path portions are changed in such a manner as to produce said focused image having said second magnification while maintaining the same angle between said optical path and the axis of said lens.

5. Apparatus as in claim 2 in which said imaging forming means effects relative movement between said optical path and said document to scan sequentially successive portions thereof.

6. Apparatus as in claim 5, further including means for moving said imaging surface synchronously with the relative movement between said optical path and said document to form a light image of said document portions on successive portions of said surface.

7. Apparatus as in claim 5 in which said image forming means comprises first means for reflecting light from said document, second means for reflecting light reflected from said first reflecting means to said lens, means for translationally moving said first reflecting means generally parallel to the document surface from an initial position to a final position to scan said surface, and means for translationally moving said second reflecting means from an initial position to a final position at such a speed as to maintain a constant optical path length between said document surface and said lens, said means for changing the lengths of said optical path portions including means for changing the spacing of said first and second reflecting means in said initial positions.

8. Apparatus as in claim 7 in which said translational moving means comprises a pulley carried by said second reflecting means, a cable trained around said pulley and having portions extending away from said pulley parallel to said document surface, and means attaching said first reflecting means to one of said cable portions, said means for changing the lengths of said optical path portions including means for moving the other of said cable portions lengthwise to change the spacing of said first and second reflecting means in said initial positions.

9. Apparatus as in claim 7 in which said second reflecting means directs reflected light along a path parallel to and spaced from the incident light path.

10. Apparatus as in claim 7 in which said second reflecting means comprises a pair of mutually perpendicular reflective surfaces.

11. Apparatus as in claim 2 in which said lens is restrained against movement in the direction of the optical axis thereof.

12. Apparatus as in claim 2 in which said lens is restrained against movement both in the direction of and transverse to the optical axis thereof.

* * * * *